(No Model.)
H. S. SMYTHE.
BUGGY WRENCH.
No. 567,695.  Patented Sept. 15, 1896.
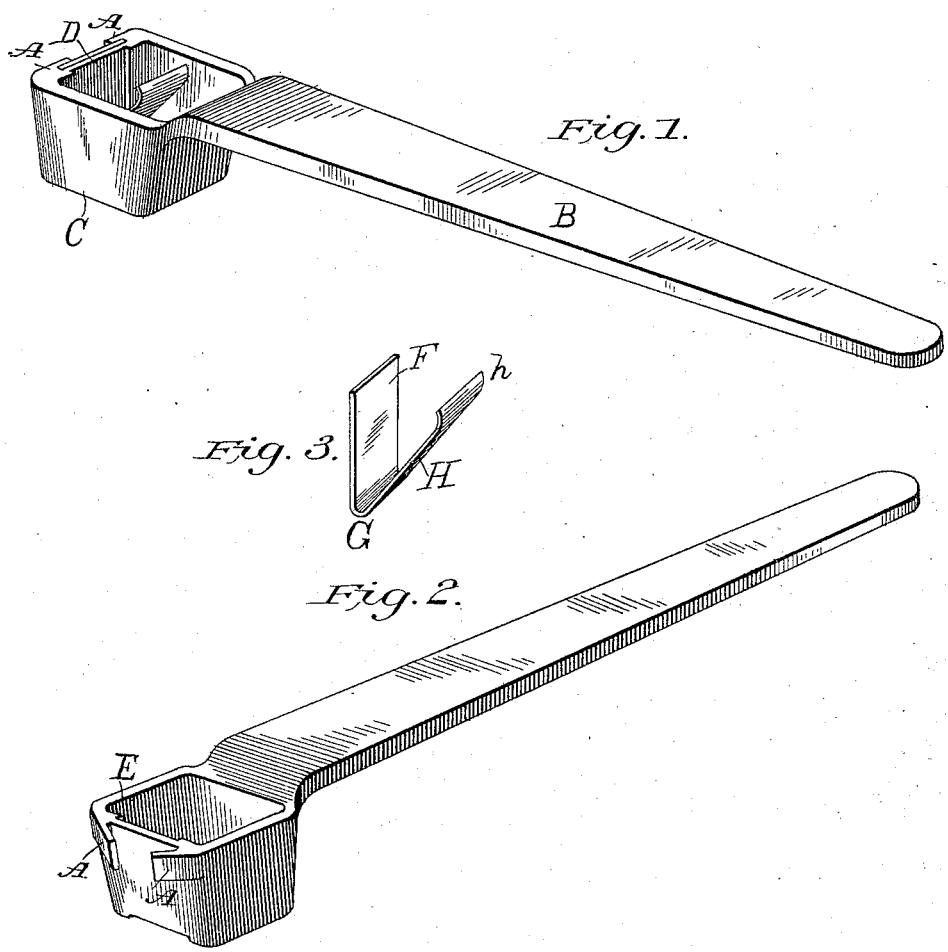
Witnesses.
F. W. Parrott
L. H. Pier
Inventor.
Homer S. Smythe

UNITED STATES PATENT OFFICE.

HOMER S. SMYTHE, OF WOONSOCKET, SOUTH DAKOTA.

BUGGY-WRENCH.

SPECIFICATION forming part of Letters Patent No. 567,695, dated September 15, 1896.

Application filed February 1, 1896. Serial No. 577,682. (No model.)

*To all whom it may concern:*

Be it known that I, HOMER S. SMYTHE, a citizen of the United States, residing at Woonsocket, in the county of Sanborn and State of South Dakota, have invented an Improvement in Buggy-Wrenches, of which the following is a specification.

This invention relates to improvements in wrenches and similar devices used to detach nuts from the spindles of buggies and carriages and for similar purposes, and the object of the invention is to provide an article of this character which will retain the nut when disengaged from the spindle and prevent the same from coming in contact with dirt, sand, or any foreign material which would be injurious to the spindle, and also prevent the necessity of handling the nut and soiling the hands; and with these and other objects in view the invention consists in the construction and arrangement of parts hereinafter more fully described in the specification, and illustrated in the accompanying drawings, in which—

Figure 1 is a perspective view of the wrench constructed in accordance with my improvement. Fig. 2 is a similar view of the same without the spring. Fig. 3 is a detail of the spring.

Similar characters of reference designate like parts throughout the several views.

Referring to the drawings, the letter B designates the handle of the wrench, which is herein shown to be flat, but any preferable form or construction of the handle may be employed. To the outer end of said handle B is secured a head or holder C, square in cross-section and in one side of which is formed a slot D, at one end of which are formed inwardly-directed shoulders or flanges E, and upon the outside of said head is formed obliquely-directed lugs or projections A, and I also provide a plate-spring F, which is bent upon itself, as shown at G, and the side H of which is directed obliquely. An extremity of said side H is curved inwardly as shown at *h*, as clearly shown in Fig. 3, and the portion F of this spring is adapted to be inserted within the head C and to be retained between the cross-projections A, which are then hammered down upon the portion F of the spring to securely retain the same in position, the portion H of the spring being adapted to enter between the shoulders E on the inside of the head C when the nut is forced into the head by means of this spring. It will be observed that a nut smaller than the head may be retained by the expansive force of this spring, and also a nut that is the exact size of the head may also be operated by the wrench, as the slot D is adapted to receive the portion H of the spring.

The operation of this device will be readily understood from the foregoing description when taken in connection with the accompanying drawings.

When it is desired to remove the spindle of a carriage or other vehicle, the head C is forced upon the nut and a portion H of the spring impinges against one side of the nut and forces the same in contact with the other side of the wrench-head, thereby securely retaining the nut within the head of the wrench and obviating the necessity of soiling the hands by handling the nut, and also preventing the nut coming in contact with dirt, grit, or any foreign substance which would be injurious to the parts, as is occasioned by laying the nut to one side while removing the wheel, &c., as will be readily understood by any one who has attempted to grease the spindle of a vehicle.

It is obvious that various changes and modification, may be made in the construction herein shown and described, and I therefore reserve the right to make all such changes and modifications thereof as fairly come within the scope of this invention.

Having fully described my invention, what I claim, and desire to secure by Letters Patent, is—

1. A nut-wrench consisting of a head provided with the usual handle, said head having formed on the inside thereof longitudinal shoulders and being also provided with retaining-lugs and a spring adapted to be secured by said lugs and to enter the space between said shoulders, when the nut is in position, substantially as described.

2. A nut-wrench consisting of a head provided with oppositely-directed lugs on the outer surface opposite the handle forming a vertical groove or channel, having a plate-spring having one end fixed in said groove, and the other bent over and down into the head as and for the purpose described.

3. In a nut-wrench consisting of the handle, and a head provided on one side thereof with interior longitudinal shoulders, said head having formed on the outer side thereof obliquely-directed lugs and a V-shaped plate-spring bent near its longitudinal center, one portion being adapted to be retained between the said lugs, and the free end to extend obliquely within the nut-head between said shoulders and adapted to hold within the head the nut when the same has been released from the spindle, substantially as shown and described.

HOMER S. SMYTHE.

Witnesses:
T. W. PARROTT,
L. H. PIER.